United States Patent [19]

Powers, III et al.

[11] Patent Number: 5,147,414

[45] Date of Patent: Sep. 15, 1992

[54] PROCESS FOR PRODUCING ORI CONTROL ADDITIVES

[75] Inventors: William J. Powers, III; Leonard A. Matthews; Marian F. Leong, all of Port Arthur; Robert W. Erickson, Jr., Nederland, all of Tex.

[73] Assignee: Texaco Inc., White Plains, N.Y.

[21] Appl. No.: 389,436

[22] Filed: Aug. 3, 1989

[51] Int. Cl.$^5$ ............................................. C10L 1/22
[52] U.S. Cl. .................................. 44/347; 548/520; 548/546
[58] Field of Search ............... 44/62, 63, 72, 71, 347; 548/546, 520; 564/505

[56] References Cited

U.S. PATENT DOCUMENTS

| | | | |
|---|---|---|---|
| 3,272,746 | 9/1966 | LeSuer et al. | 44/63 |
| 3,497,334 | 2/1970 | Gee et al. | 44/63 |
| 3,806,456 | 4/1974 | Vogel | 44/63 |
| 4,053,743 | 10/1977 | Niemi | 364/500 |
| 4,107,061 | 8/1978 | Sturwold et al. | 252/49.3 |
| 4,239,493 | 12/1980 | Niemi et al. | 364/500 |
| 4,604,103 | 8/1986 | Campbell | 44/72 |
| 4,631,069 | 12/1986 | Sung | 44/56 |
| 4,643,737 | 2/1987 | Sung et al. | 44/63 |
| 4,643,738 | 2/1987 | Sung et al. | 44/63 |
| 4,689,051 | 8/1987 | Sung | 44/57 |
| 4,747,851 | 5/1988 | Sung et al. | 44/72 |
| 4,810,263 | 3/1989 | Zimmerman et al. | 44/62 |

*Primary Examiner*—Margaret Medley
*Attorney, Agent, or Firm*—Robert A. Kulason; James J. O'Loughlin; Vincent A. Mallare

[57] ABSTRACT

An improvement in a method of producing an ORI control additive which is the reaction product of a polybutenyl succinic anhydride and a polyoxyalkylene diamine, wherein the improvement comprises reacting solvent free the anhydride and diamine at an increased temperature and monitoring the absorbancy of the reaction product to determine the degree of reaction completion.

3 Claims, No Drawings

PROCESS FOR PRODUCING ORI CONTROL ADDITIVES

BACKGROUND OF THE INVENTION

This invention relates to a method of producing an octane requirement increase (ORI) control additive for motor fuels such as gasoline. More particularly, it relates to an improved method of producing an ORI control additive.

Modern internal combustion engines are designed to operate using a non-leaded gasoline as fuel. Some engines will, although initial operation on the design fuel was satisfactory, after a period of time develop a propensity to "knock" under load. As the problem increases in severity, the engine can continue to fire erratically after the ignition has been shut off, a behavior referred to as "dieseling". This reduced driveability can sometimes be corrected by adjusting ignition timing but may require the operator to switch to a higher octane fuel. The phenomenon observed is thus referred to as octane requirement increase (ORI).

There have been additives produced which control the ORI and provide the ORI control necessary in fuels of lower octane. However, the process by which the ORI control additives have been made is more costly and requires excessive time to provide the desired ORI control additive.

Thus, it is an object of the present invention to provide a means of producing these ORI control additives at less cost and in significantly less time while having a greater yield of product (i.e., ORI control additive).

DISCLOSURE STATEMENT

U.S. Pat. No. 4,053,743 discloses a method for controlling the pH and other concentration variables of a controlled feed component, wherein when at least one desired outlet concentration or a function dependent on outlet concentration is given, initially the apparent output concentration of at least one other feed component is calculated with the aid of the inlet concentration and the residence time distribution of the controlled feed component from the inlet to the outlet flow thereof.

Co-assigned U.S. Pat. No. 07/211,937 now abandoned discloses a method for producing a motor fuel composition which inhibits engine ORI and intake valve deposit formation therein., Co-assigned U.S. Pat. No. 07/322,796 now U.S. Pat. No. 4,920,050 discloses a method of predetermining the exact weight ratio of the reactants to produce a product and maintain the weight ratio of the reactants to obtain a maximum yield of the product.

SUMMARY OF THE INVENTION

This invention provides an improvement in a method of producing an ORI control additive which is the reaction product of a polyoxyalkylene diamine and an alkenyl-succinic anhydride. The improvement comprises reacting solvent free the anhydride and diamine at a temperature ranging from about 325° F. to about 375° F. and monitoring the absorbancies of the reaction product by infrared spectroscopy to determine the degree of reaction completion, whereby when the absorbancies are equivalent in two successive time periods, the reaction is stopped/completed and the reaction product withdrawn.

The reaction product produced according to this invention is a bis-succinimide of a polyoxyalkylene diamine.

DETAILED DESCRIPTION OF THE INVENTION

The present improvement in a method of preparing an ORI additive has been developed to facilitate and ease the production of an ORI control additive.

The preparation of a composition useful in controlling ORI was disclosed in copending U.S. Pat. No. 07/211,937. In the present invention there is disclosed an improved procedure for the preparation of the composition. The processing improvement consists of eliminating the use of a solvent for the reaction, operating at an increased temperature and determining the degree of completion of the reaction using infrared spectroscopy. The advantages resulting from the application of this improvement include:

1) shortening of reaction time while permitting a higher batch yield, thus improving the economics of the operation;
2) reduction of the possibility of atmospheric hydrocarbon emissions during preparation of the composition as no hydrocarbon is refluxed; and
3) higher selectivity for the formation of the desired product.

According to the present invention, an improvement is provided in a method of producing an ORI control additive which is the reaction product of a polybutenyl succinic anhydride having a molecular weight of 500–10,000 and a polyoxyalkylene diamine. The improvement comprising reacting solvent free anhydride and diamine at a temperature ranging from about 325° F. to about 375° F. and monitoring the absorbancies of the reaction product by infrared spectroscopy to determine the degree of reaction completion, whereby when the absorbancies are equivalent in two successive time periods, the reaction is stopped/completed and the reaction product withdrawn.

In the method the preferred temperature at which the reaction takes place is about 350° F.

The absorbancy of the reaction product is measured at $1705 cm^{-1}$ according to the process described below in Table I.

In the method set forth in Table I below, the absorbancy of the imide carbonyl of the reaction product is periodically measured at $1705 cm^{-1}$.

The reaction product is a bis-succimide of a polyoxyalkylene diamine, and the reaction time of producing the reaction product is about 5.0 to about 12.0 hours.

TABLE I
PROCESS CONTROL TEST FOR THE MANUFACTURE OF ORI CONTROL AGENT

PURPOSE:

Test method to control the manufacture of an ORI control additive by maximizing the imidization reaction as judged by the imide band increase at $\sim 1705 cm^{-1}$.

EQUIPMENT:

1. Perkin-Elmer Model #782 Dual Beam Infrared Spectrometer or equivalent.
2. 0.4 mm Sodium Chloride cell.
3. 4 Dram vials - 10 milliliter capacity.
4. 5.0 milliliter Volumetric pipet.
5. Instrument Conditions:
   a. Absorbance Mode
   b. Slit 2
   c. Scan Time 3 minutes
   d. Noise Filter 4

TABLE I-continued

PROCESS CONTROL TEST FOR THE MANUFACTURE OF ORI CONTROL AGENT e. Chart Expansion 1
f. Resolution 3.2 cm$^{-1}$ METHOD:
1. Weigh 2.000 +/− 0.005 grams of sample into a 4 dram vial.
2. Pipet 5.0 milliliters of carbon tetrachloride into the vial, then cap and shake until sample is dissolved.
3. Fill a 0.4 mm infrared cell with the carbon tetrachloride solution and scan from 1900 cm$^{-1}$ to 1600 cm$^{-1}$ in the absorbance mode.
4. Determine the absorbance of the imide peak at ~1705 cm$^{-1}$, using a one point baseline drawn from ~1850 cm$^{-1}$, against air.
5. Report result in Absorbance at 1705 cm$^{-1}$.

The advantages of operation using the present improvements can best be demonstrated by use of comparative examples as provided below. Preparation of the ORI controlling composition according to a procedure such as those discussed in the above cited reference, especially in U.S. Pat. No. 07/211,937 is described below in Example A. Operation of the improved process of the present invention is described in Example B. In Examples A and B, the completeness of the conversion being effected was determined by monitoring the absorbance of the infrared peak occurring at 1705 cm$^{-1}$. The procedure for this is as set forth above in Table I. The reaction was considered to be complete when two consecutive hourly samples exhibited equivalent absorbances when measured using the spectroscopic method of Table I.

EXAMPLE A

A ten gallon stainless steel reactor equipped with a motor driven turbine agitator, a ring sparger for gas delivery, a heating jacket and a cooled condenser for condensation of overhead vapors was charged with a mixture of mixed xylenes (50 parts by weight), a polyoxyalkylene diamine exhibiting an effective molecular weight of 3402, as calculated from a total base number determined using ASTM D2896 (21.3 parts by weight), and a polyisobutenylsuccinic anhydride having a molecular weight of 2123 (28.7 parts by weight). The stirrer was started and nitrogen introduced through the sparger at a rate of 1.06 SCFH/gallon. The mixture was heated under total reflux and samples periodically withdrawn and their infrared spectra taken. The results of these analyses are presented below in Table III. The absorbance at 1705 cm$^{-1}$ was still increasing slowly after 10 hours at reflux, at which time external application of heat was stopped and the product withdrawn from the reactor through a cartridge filter.

EXAMPLE B

A ten gallon reactor as described in Example A, above, was charged sequentially with a polyoxyalkylene diamine exhibiting an effective molecular weight of 3402, as calculated from a total base number determined using ASTM D2896 (42.5 parts by weight), and a polyisobutenylsuccini anhydride having a molecular weight of 2123 (57.5 parts by weight). The stirrer was started and nitrogen introduced through the sparger at a rate of 1.06 SCFH/gallon. Heat was applied and the reaction mass brought to a temperature of 350°0 F. Samples were periodically withdrawn and their infrared spectra taken. The results of these analyses are presented below in Table IV. Reaction was judged complete after 8 hours at 350° F., at which time external application of heat was stopped. The product was withdrawn from the reactor through a cartridge filter.

Below, in Table II, the process for making the infrared analysis is set forth.

TABLE II

PROCESS CONTROL TEST FOR THE MANUFACTURE OF ORI CONTROL AGENT

PURPOSE: Test method to control the manufacture of ORI control agent by maximizing the imidization reaction as judged using percent imide conversion.

EQUIPMENT:
1. Nicolet Model #740 Infrared Spectrometer with Mid-Range HgCdTe detector.
2. Analytical Balance with 1 mg/division sensitivity.
3. 0.1 mm Sodium Chloride cell (3.5 mm dia. window).
4. 4 Dram vials ~10 milliliter capacity.
5. Xylene DATA COLLECTION PARAMETERS:
a. Absorbance Mode
b. Velocity: 55
c. Number of Scan: sample and background - 256
d. Gain: 1
e. Aperture: MD
f. Resolution 2.0 cm$^{-1}$
g. Baseline Correction
h. Background: Xylene in 0.1 mm Sodium Chloride cell METHOD:
1. Weigh 1.000+/−0.005 grams of sample into a 4 dram vial.
2. Weigh 1.000+/−0.005 grams of xylene into the vial and sample, then cap, heat and shake until sample is dissolved.
3. For reactor samples containing xylene as a diluent, go to step #5.
4. Fill a 0.1 mm infrared cell with xylene and scan (background subtract).
5. Determine the absorbance of the imide band at ~1705 cm$^{-1}$, amic acid band at ~1732 cm$^{-1}$ and the Amide I band at ~1677 cm$^{-1}$ using a two point baseline drawn from ~1755 cm$^{-1}$ to ~1655 cm$^{-1}$. Record results in Absorbance at 1705 cm$^{-1}$, 1677 cm$^{-1}$ and 1732 cm$^{-1}$ for calculation of the percent imide conversion.

CALCULATION: PERCENT IMIDE CONVERSION $$\frac{1705 \text{ abs}}{1705 \text{ abs} + 1677 \text{ abs} + 1732 \text{ abs}} \times 100 \text{ Percent Imide Conversion}$$

(NOTE: The reaction can be stopped at a predetermined imide conversion calculated from the equation provided above).

The results i.e., infrared spectra, of (1) the mixture of Example A under total reflux, and (2) the samples of Example B heated to 350° F. are, respectively, provided below in Table III and Table IV.

TABLE III

REACTION IN XYLENE SOLVENT (IR DATA)

| HRS OF REACTION | ABSORBANCE (AT 1705 CM$^{-1}$) |
|---|---|
| 0.0 | 0.19 |
| 0.5 | 0.20 |
| 1.0 | 0.22 |
| 2.0 | 0.24 |
| 3.0 | 0.26 |
| 4.0 | 0.27 |
| 5.0 | 0.28 |
| 6.0 | 0.29 |
| 7.0 | 0.30 |
| 8.0 | 0.31 |
| 9.0 | 0.32 |
| 10.0 | 0.34 |

TABLE IV

| | |
|---|---|
| NEAT REACTION AT 350° C. | |
| HRS OF REACTION | ABSORBANCE (AT 1705 CM$^{-1}$) |
| 3.0 | 0.84 |
| 4.0 | 0.875 |
| 5.0 | 0.875 |
| 6.0 | 0.935 |
| 7.0 | 0.945 |
| 8.0 | 0.955 |
| 8.0 | 0.98 |

In the process of preparing for commercialization, larger batches were made in a 500 gallon reactor equipped with a motor driven turbine agitator, a ring sparger for gas delivery, a heating jacket and a cooled condenser for condensation of overhead vapors. A summary of these preparations is given below in Table V. The infrared spectrophotometric analysis technique (Table II, above) used to monitor the reaction was slightly different. The comparison of these results shows a significant advantage for using the present process.

TABLE V

| | EXAMPLE | |
|---|---|---|
| | C | D |
| Polyoxyalkylene diamine, parts | 21.3 | 42.5 |
| Polyisobutenyl succinic anhydride, parts | 28.7 | 57.5 |
| Mixed xylenes, parts | 50.0 | none |
| Reaction Temperature, F. | 300 | 350 |
| Reaction Time, hrs | 41 | 5 |

TABLE V-continued

| | EXAMPLE | |
|---|---|---|
| | C | D |
| Conversion to succinimide, wt % | 61.1 | 71.7 |

These larger scale batches dramatically demonstrate the advantage of using our improvement in reaction time required to prepare the ORI suppressant. Use of the improved procedure does not compromise the effectiveness of the product. Suppressants made using the technology disclosed in U.S. Pat. No. 07/211,937 (i.e. such as in Examples A and C, above) and the improved process (i.e., as in Examples B and D above) both result in an octane requirement increase of ca 5 octane numbers at a dose of 30 PTB. In comparison, testing of a fuel blended without the suppressant results in an octane requirement increase of 10 or more octane numbers.

We claim:

1. A method of producing an ORI control additive which is the reaction product of a polybutenyl succinic anhydride having a molecular weight of 500–10,000 and a polyoxyalkylene diamine, wherein the improvement comprises reacting solvent free said anhydride and diamine at a temperature ranging from about 325° C., measuring the relative absorbancy of the reaction product at 1705cm$^{-1}$ and the reaction for about 5.0 to about 12.0 hours and monitoring the absorbancies so that when they are equivalent in two successive time periods, the reaction is stopped/completed and the reaction product withdrawn.

2. The method of claim 1 wherein the temperature is about 350° F.

3. The method of claim 1 wherein the reaction product is a bis-succinimide of a polyoxyalkylene diamine.

* * * * *